(12) United States Patent
Sternkopf et al.

(10) Patent No.: US 12,115,715 B2
(45) Date of Patent: Oct. 15, 2024

(54) APPARATUS AND METHOD FOR TREATING PLASTIC PREFORMS

(71) Applicant: KRONES AG, Neutraubling (DE)

(72) Inventors: Bernhard Sternkopf, Burglengenfeld (DE); Thomas Hoellriegl, Teublitz (DE); Florian Geltinger, Donaustauf (DE)

(73) Assignee: KRONES AG, Neutraubling (DE)

( * ) Notice: Subject to any disclaimer, the term of this patent is extended or adjusted under 35 U.S.C. 154(b) by 268 days.

(21) Appl. No.: 17/408,822

(22) Filed: Aug. 23, 2021

(65) Prior Publication Data

US 2022/0063170 A1    Mar. 3, 2022

(30) Foreign Application Priority Data

Aug. 27, 2020   (DE) ..................... 10 2020 122 470.2

(51) Int. Cl.
*B29C 49/42*        (2006.01)
*B29C 49/64*        (2006.01)

(52) U.S. Cl.
CPC ...... *B29C 49/4205* (2013.01); *B29C 49/6418* (2013.01)

(58) Field of Classification Search
None
See application file for complete search history.

(56) References Cited

U.S. PATENT DOCUMENTS

| | | | |
|---|---|---|---|
| 6,264,457 B1 † | 7/2001 | Ohmes | |
| 7,832,546 B2 * | 11/2010 | Preti ...................... | B65G 29/00 |
| | | | 198/473.1 |
| 2010/0108473 A1 | 5/2010 | Soncini | |
| 2014/0167301 A1 | 6/2014 | Schoenberger et al. | |

FOREIGN PATENT DOCUMENTS

| | | |
|---|---|---|
| DE | 102008020116 A1 | 10/2009 |
| DE | 10 2012 102 357 A1 | 9/2013 |
| DE | 102015107814 A1 | 12/2016 |
| DE | 10 2017 100635 A1 | 7/2018 |
| DE | 10 2018 111235 A1 | 11/2019 |
| DE | 20 2018 106 385 U1 | 2/2020 |
| WO | 2018146211 A1 | 8/2018 |

* cited by examiner
† cited by third party

*Primary Examiner* — William R Harp
(74) *Attorney, Agent, or Firm* — Schmeiser, Olsen & Watts, LLP

(57) ABSTRACT

Provided is a method for treating plastic preforms, wherein the plastic preforms are transported in a row by a feed transport device and are separated by a separating device, wherein the separating device has a carrier which is rotatable with respect to a predetermined axis of rotation and has on its outer circumference a plurality of recesses for receiving the plastic preforms in a takeover area and which are equidistant from one another in a circumferential direction of the carrier, wherein the separating device transporting the plastic preforms separately along a predetermined transport path section, and wherein the separating device transferring the plastic preforms in a transfer area to a further transport device which transports the plastic preforms further at a predetermined transport speed. During a start-up process, the separating device increases a transport speed at which it conveys the plastic preforms from the takeover area to the transfer area.

9 Claims, 1 Drawing Sheet

APPARATUS AND METHOD FOR TREATING PLASTIC PREFORMS

CROSS-REFERENCE TO RELATED APPLICATION

Figure 1:
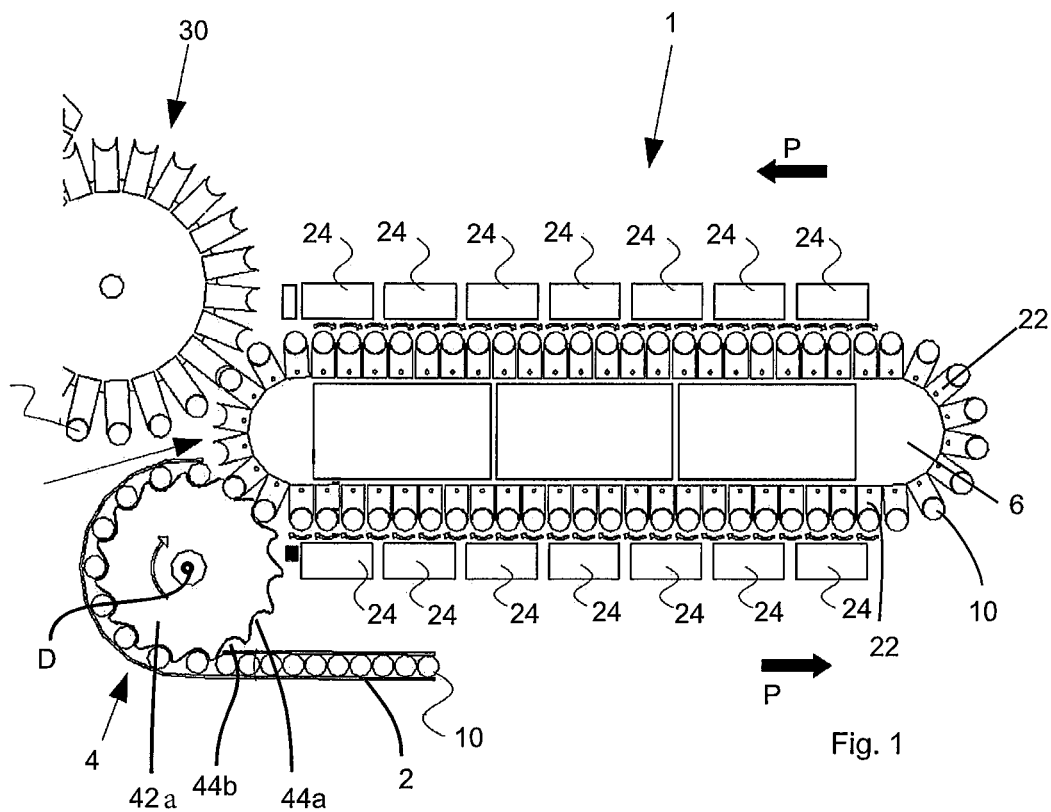

This application claims priority to German Application No. 10 2020 122 470.2, having a filing date of Aug. 27, 2020, the entire contents of which are hereby incorporated by reference.

FIELD OF TECHNOLOGY

The following relates to a method and an apparatus for treating plastic preforms. It is known from the conventional art that so-called plastic preforms are first heated during the production of containers, and are subsequently formed into the containers, for example bottles, in this heated state by a forming device, in particular a stretch blow-moulding machine. For this purpose, it is partly known that the plastic preforms are first sorted, then fed to a separating device via a feed device, such as a feed chute, and this separating device separates the plastic preforms and feeds them to a further transport device, in particular an oven, for heating the plastic preforms.

BACKGROUND

To be more precise, the preforms are usually fed to a processing unit by a rail, and separated by a separating device, for example in the form of a saw-tooth star. The plastic preforms are usually stopped in front of this saw-tooth star by a restraining device, such as a preform lock. At the start of production, in the conventional art, the following transport device and also the separating device are usually already brought up to their transport speed. As soon as this has happened, the restraining device releases the plastic preforms. In particular with high machine outputs, the plastic preforms must therefore be accelerated to a high speed in a very short time starting from the standstill in the restraining device.

In the conventional art, this repeatedly leads to malfunctions in the area of the separating devices or the star or also the retaining device, or also the infeed guide or the feed of the plastic preforms. From the internal conventional art, a procedure is known in which two transport stars are provided which accelerate differently. However, it would be desirable to avoid the above disturbances in a different or simpler way.

SUMMARY

An aspect relates to a method for treating plastic preforms, the plastic preforms are transported in a row by a feed transport device and separated by a separating device. This separating device has a carrier which is rotatable with respect to a predetermined axis of rotation, and/or a carrier which is rotatable with respect to a predetermined axis of rotation rotates during the separating process. The carrier has on its outer circumference a plurality of recesses equidistant to each other in the circumferential direction of the carrier for receiving the plastic preforms in a takeover area. Furthermore, the separating device conveys the plastic preforms singly along a predetermined transport path section and the separating device transfers the plastic preforms in a transfer area to a further transport device, which transports the plastic preforms further at a predetermined transport speed.

According to embodiments of the invention, during a start-up process, the separating device increases a transport speed at which it conveys the plastic preforms from the takeover area to the transfer area.

It is therefore proposed that the plastic preforms are not transferred directly to the separating device, which is already rotating at transport speed, during the start-up process, as is common in the state of the art, but rather that this is started at a lower speed and only during the conveying of the first plastic preforms is this speed accelerated to the working speed and/or up-synchronised. In an embodiment, therefore, the rotational speed of the carrier is increased during a startup process of the machine. This rotational speed can be increased starting from a standstill or also starting from a (lower) initial speed.

It is possible that the separating device and at least one further transport device, for example, a transport device following the separating device, are decoupled from each other. This means that synchronisation between the separating device and this transport device is at least temporarily cancelled, for example, at least in the period of a start-up.

It is possible that such a coupling and/or synchronisation exists during normal operation, but that it is cancelled for the purpose of starting. Such a procedure can also be selected in the event of malfunctions. If, for example, a malfunction occurs at the separating device, the coupling can be cancelled and the separating device (immediately) braked. The following transport device can continue to run, for example until the heating device has run empty.

In an embodiment, before or during this acceleration process of the separating device, the feed of plastic preforms into the separating device is started, so that the first plastic preforms entering the separating device are taken over or transported at a lower speed. Thus, a transport speed of the first plastic preforms entering the separating device is increased from a predetermined initial speed to the working speed. In an embodiment, this initial speed also changes or increases from the first to further plastic preforms.

In an embodiment, this transport speed is continuously increased.

In an embodiment, therefore, the separating device or, for example, the above-mentioned carrier or saw-toothed star initially rotates at a reduced power compared to the following unit. As soon as the first plastic preforms are fed in, which can take place, for example, after a restraining device has been opened, this sawtooth-shaped star or the separating device synchronises up to the production speed up to the transfer point.

In this way, the acceleration times for the plastic preforms are reduced and the susceptibility to faults in this area is also significantly reduced.

The procedure according to embodiments of the invention thus solves clocking-in problems during start-up. This procedure can be selected whenever the machines are stopped in a working operation and, for example, when the separating device has to be resynchronised to the working speed of the following transport device.

In an embodiment, the feed transport device conveys the plastic preforms in a row. In an embodiment, the feed transport device is designed as a feed rail within which the plastic preforms are conveyed. This conveying can be done, for example, by gravity or the downhill force. For example, the plastic preforms are conveyed at least partially and completely touching each other, i.e., for example, each plastic preform touches two other plastic preforms.

In a further embodiment, the further transport device is for example, a chain conveyor. In an embodiment, the further transport device also conveys the plastic preforms separately.

In a further embodiment, the separating device has a guide arch. In an embodiment, the plastic preforms are transported between a (for example, saw-toothed) outer circumference of the carrier and the guide arch or an outer circumference of the carrier and an inner circumference of this guide arch.

In a further embodiment, the separating device increases the transport speed until it corresponds to the transport speed of the further transport device. In an embodiment, the further transport device is already operated at the working speed at this point.

In this way, a transport speed of the separating device is synchronised to the working speed and, for example, synchronised during the start-up process.

In a further method, the plastic preform that is fed to the separating device after the device has started up experiences the greatest acceleration.

With regard to this or these first plastic preforms, the described procedure is also most effective, since from this point onwards the conveying through the feed rail or feed transport device has also started and the plastic preforms also move in the feed rail with increasing speed. In this way, the susceptibility to faults can be reduced.

The subsequent plastic preforms, i.e., the preforms following the first plastic preform, are already accelerated less overall during transport with the separating device, as this already has a higher initial speed.

In a further embodiment, a blocking device releases the feed of the plastic preforms into the separating device before or during the start-up process. This blocking device can be arranged at an inlet of the separating device. By opening the blocking device, the plastic preforms enter the separating device and are conveyed by it.

In a further method, the further transport device is first accelerated to a working speed, and then the separating device is loaded with plastic preforms and also accelerated to the working speed.

In a further method, the separating device is accelerated from an initial speed to a working speed. This initial speed can also be a standstill of the separating device. In an embodiment, the acceleration of the separating device from the initial speed to the operating speed takes place within an angle of rotation or in a rotational movement of the carrier which is greater than 20°, greater than 40°, greater than 60°, greater than 80°, greater than 100°, greater than 120° and greater than 140° and greater than 160°, f greater than 180°, or greater than 190°.

In an embodiment, this acceleration from the initial speed of the separating device to the final speed of the separating device takes place within an angle of rotation or in a rotational movement which is less than 350°, less than 340°, less than 320°, or less than 300°.

In an embodiment, a predetermined number of plastic preforms is accelerated through the separating device, wherein the predetermined number being greater than five, for example, greater than 10. In an embodiment, the predetermined number is less than 125, less than 75, less than 50, or less than 40.

These angular ranges, in which the synchronisation or acceleration of the separating device takes place, have proven to be particularly favourable in order to achieve a geometrically favourable feed of the plastic preforms on the one hand and to realise acceptable accelerations of the separating device on the other hand.

However, it would also be possible that simultaneously with the start-up of the separating device or with the acceleration, the further transport device is also accelerated, wherein in an embodiment it is ensured that at least at the moment when the plastic preform arrives at the further transport device, the latter has already reached its working speed.

In a further method, the plastic preforms are heated during transport with the further transport device. In an embodiment, the further transport device conveys the plastic preforms through an oven, such as an infrared oven. In an embodiment, stationary heating devices, for example infrared radiators, are used to heat the plastic preforms. However, it would also be possible for the plastic preforms to be heated by microwaves.

In an embodiment, the plastic preforms are gripped by the further transport device with a plurality of holding devices, such as for example holding mandrels, and transported separately. In an embodiment, the plastic preforms are also rotated with respect to their longitudinal axes during heating by the heating device by the holding device. In an embodiment, the plastic preforms are formed after heating, for example stretch-blown.

In an embodiment, the plastic preforms, as soon as they reach the further transport device, are already transported by this further transport device at the desired working speed. In this way, the time during which the plastic preforms are heated can be determined very precisely and also kept as constant as possible, which ultimately also has a positive effect on the heating process of the plastic preforms.

Embodiments of the present invention are further directed to an apparatus for treating plastic containers. This has a feed transport device which is suitable and intended for transporting the plastic preforms in a row, as well as a separating device which is arranged downstream of the feed transport device in a transport direction of the plastic preforms and which conveys the plastic preforms separately (for example, at a distance from one another).

In this case, the separating device has a carrier which is rotatable with respect to a predetermined axis of rotation and has, on its outer circumference, a plurality of recesses for receiving the plastic preforms in a takeover area and which are equidistant from one another in a circumferential direction of the carrier and are intended, wherein this separating device transporting the plastic preforms separately (for example, at equidistant intervals) along a predetermined transport path section.

Furthermore, the apparatus has a further transport device which adjoins the separating device in the transport direction, wherein the plastic preforms can be transferred from the separating device to this further transport device in a transfer area, and the further transport device transports the plastic preforms further at a further predetermined transport speed. For example, this further transport speed is a working speed at which the plastic preforms are transported.

According to embodiments of the invention, the apparatus has a control device for controlling the separating device and/or the further transport device, which causes the separating device to increase a transport speed at which it conveys the plastic preforms from the takeover area to the transfer area during a start-up process.

It is therefore also proposed on the apparatus side that a control device causes the separating device to be synchronised, for example, in order to convey the first plastic preforms from the takeover area to the transfer area.

In an embodiment, a common control device is provided for controlling the separating device and the further transport device.

In a further embodiment, the apparatus comprises a blocking device which is arranged between the feed transport device 2 and the separating device 4 and which can be switched in such a way that it enables or prevents the plastic preforms from being fed to the separating device.

Thus, when this blocking device is in a blocking state, no plastic preforms can reach the separating device. As soon as the blocking device is released, which can be done for example by a blocking element or a blocking finger, the plastic preforms can enter the separating device and be transported further by it.

In a further embodiment, the control device controls the separating device in such a way that the separating device and the further transport device can be operated synchronised in a working mode, and for example, the control device controls the separating device during the start-up process in such a way that the transport speed of the first plastic preform fed to the separating device during the start-up process is synchronised to the transport speed of the further transport device during the transfer to the further transport device in the transfer area.

In a further embodiment, the control device also controls the further transport device, for example, in such a way that, at the latest when the first plastic preform is transferred to the further transport device, the latter has already reached the working speed.

In an embodiment, the control device causes a substantially constant acceleration of the separating device. In this way, jerky movements can also be prevented.

In a further embodiment, the above-mentioned transport carrier of the separating device has a segmented structure. For example, it can have two segments, which can be assembled and disassembled separately from each other if necessary.

BRIEF DESCRIPTION

Figure 2:
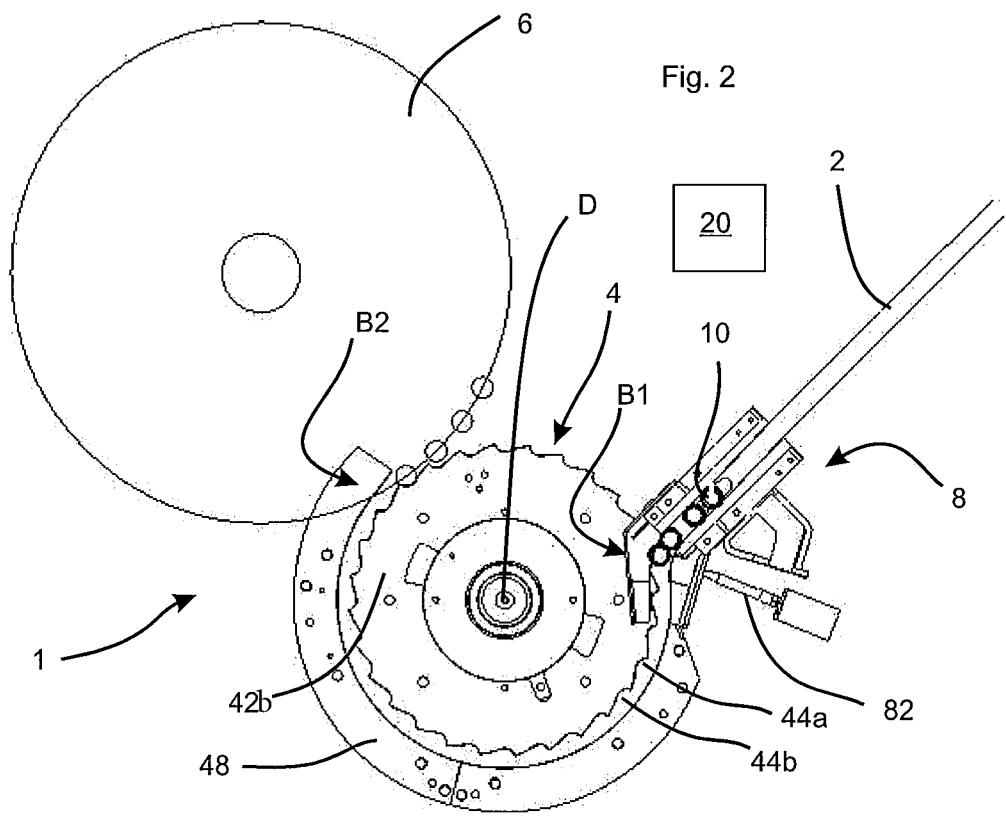

Some of the embodiments will be described in detail, with reference to the following figures, wherein like designations denote like members, wherein:

FIG. 1 shows a representation of a system for producing containers according to embodiments of the invention; and FIG. 2 shows a detailed illustration of embodiments of the invention.

DETAILED DESCRIPTION

FIG. 1 shows a heating device for heating plastic preforms 10. Here, the reference sign 6 refers in its entirety to a further transport device which transports the plastic preforms along a transport path P and past stationary arranged heating devices 24. In the embodiment shown in FIG. 1, this transport device is a circulating chain on which a plurality of holding elements 22 are arranged for holding the plastic preforms. These plastic preforms can also be rotated, as indicated by the small arrows.

The reference sign 4 indicates a feed transport device 4, which is designed here as a clocking-in star. It can be seen that the plastic preforms are fed via a feed rail 2 and are separated by the feed transport device 4. The reference sign 42a indicates a carrier which is rotatable with respect to an axis of rotation D and the reference signs 44a and 44b indicate two holding devices which are designed here as recesses which are in turn arranged on the circumference of the rotatable carrier 42a.

The reference sign 30 indicates a downstream transport device with which the now heated plastic preforms are transferred to a device (not shown) for forming plastic preforms into plastic containers, such as a blow moulding machine.

FIG. 2 shows a schematic representation of an apparatus 1 according to embodiments of the invention, which has a feed transport device 2 within which plastic preforms 10 are conveyed. Here, this feed transport device 2 has two transport rails between which the plastic preforms are conveyed, for example, on their support ring.

The reference sign 8 identifies in its entirety a blocking device which allows or blocks the feeding of the plastic preforms to a separating device 4. For this purpose, this blocking device has a blocking element 82, which can be pneumatically advanced or removed, for example.

The separating device 4 has a support 42b which is rotatable with respect to an axis of rotation D and has a plurality of recesses 44a and 44b in its outer circumference, each of which is suitable for receiving the plastic preforms. The reference sign 48 indicates a guide bend, wherein the plastic preforms can be received between the guide bend and the recesses 44a and 44b and can thus also be transported.

The reference sign 6 indicates the further transport device which, as mentioned above, serves to transport the plastic preforms during their heating. In this area, as mentioned above, the plastic preforms are transported separately and also heated separately. The separating device 4 thus creates the distance between the individual plastic preforms that is also maintained by the further transport device 6.

The reference sign 20 roughly indicates a control device which is used to control the separating device (or its drives), optionally also the preform stop 8 and optionally also the further transport device 6.

As mentioned above, this control device 20 causes the plastic preforms to be accelerated between the takeover area B1 and the transfer area B2 from a certain initial speed to the working speed or the transport speed of the further transport device 6.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

LIST OF REFERENCE SIGNS 1 apparatus
2 feed transport device
4 separating device
6 further transport device
8 blocking device/preform stop
10 plastic preforms
20 control device
22 holding element
24 heating device
30 subordinate transport device
42 carrier
44 a, b recesses 48 guide bend
B1 takeover area
B2 transfer area
D axis of rotation
P transport path

The invention claimed is:

1. A method for treating plastic preforms, wherein the plastic preforms are transported in a row by a feed transport device and are separated by a separating device, wherein the separating device has a carrier which is rotatable with respect to a predetermined axis of rotation and which has on its outer periphery a plurality of recesses equidistant from one another in a peripheral direction of the carrier for receiving the plastic preforms in a takeover area, wherein the separating device transports the plastic preforms separately along a predetermined transport path section and wherein the separating device transfers the plastic preforms in a transfer area to a further transport device which transports the plastic preforms further at a predetermined transport speed, the method comprising: increasing a transport speed at which the separating device conveys the plastic preforms from the takeover area to the transfer area during a production start up process, wherein the transport speed at which the separating device conveys the plastic preforms from the takeover area to the transfer area is continuously increased until reaching the predetermined transport speed of the further transport device.

2. The method according to claim 1, wherein the separating device increases the transport speed until the transport speed corresponds to the predetermined transport speed of the further transport device.

3. The method according to claim 1, wherein a blocking device releases the feed of the plastic preforms into the separating device before or during the production start-up process.

4. The method according to claim 1, wherein first the further transport device is accelerated to a working speed and then the separating device is loaded with plastic preforms and is also accelerated to the working speed.

5. The method according to claim 1, wherein the plastic preforms are heated during transport with the further transport device.

6. An apparatus for treating plastic containers, comprising:
a feed transport device which is suitable for transporting the plastic preforms in a row and with a separating device which is arranged downstream of the feed transport device in a transport direction of the plastic preforms, which separates the plastic preforms, wherein the separating device includes a carrier which can be rotated with respect to a predetermined axis of rotation and which, on its outer circumference, has a plurality of recesses for receiving the plastic preforms in a takeover area and which are equidistant from one another in a circumferential direction of the carrier, wherein the separating device transports the plastic preforms separately along a predetermined transport path section and with a further transport device which adjoins the separating device in the transport direction, wherein the plastic preforms can be transferred in a transfer area from the separating device to the further transport device and the further transport device transports the plastic preforms further at a predetermined transport speed, wherein the apparatus has a control device for controlling the separating device and/or the further transport device such that during a start-up process of the apparatus, the separating device increases a transport speed at which it conveys the plastic preforms from the takeover area to the transfer area, and wherein the transport speed at which the separating device conveys the plastic preforms from the takeover area to the transfer area is continuously increased until reaching the predetermined transport speed of the further transport device.

7. The apparatus according to claim 6, wherein the apparatus has a blocking device which is arranged between the feed transport device and the separating device and which can be switched such that the blocking device enables or prevents the plastic preforms from being fed to the separating device.

8. The apparatus according to claim 6, wherein the control device controls the separating device such that in an operating mode the separating device and the further transport device can be operated in a synchronised manner, wherein the control device controls the separating device during the start-up process such that the transport speed of the first plastic preform fed to the separating device during the start-up process is synchronised with the predetermined transport speed of the further transport device during the transfer to the further transport direction in the transfer area.

9. The apparatus according to claim 6, wherein the transport carrier has a segmented structure.

* * * * *